R. E. GIBBONS & D. N. ASHMORE.
Feather-Renovator.
No. 207,266. Patented Aug. 20, 1878.
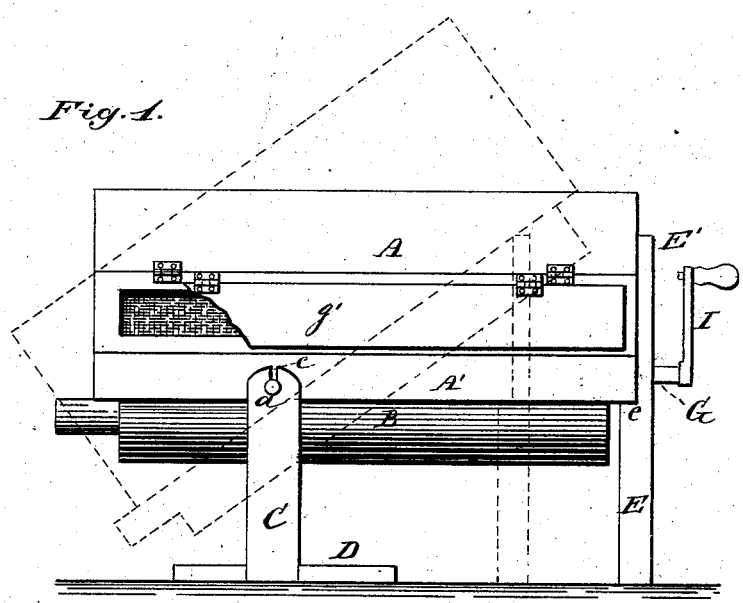
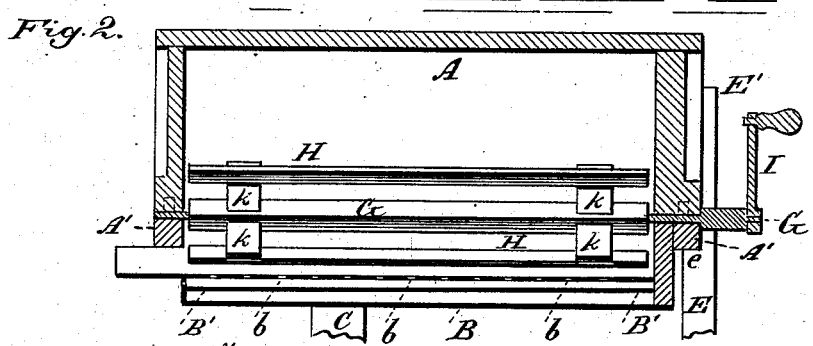
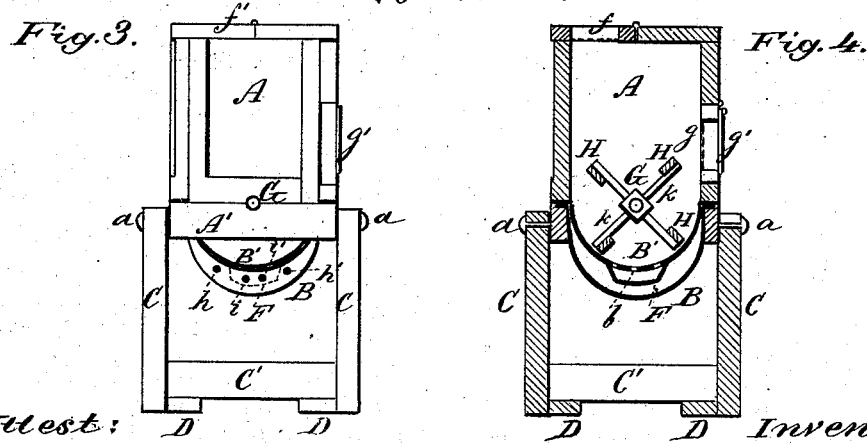

UNITED STATES PATENT OFFICE.

ROBERT E. GIBBONS AND DAVID N. ASHMORE, OF BETHANY, ILLINOIS.

IMPROVEMENT IN FEATHER-RENOVATORS.

Specification forming part of Letters Patent No. 207,266, dated August 20, 1878; application filed February 12, 1878.

*To all whom it may concern:*

Be it known that we, ROBERT E. GIBBONS and DAVID N. ASHMORE, of Bethany, in the county of Moultrie and State of Illinois, have invented certain new and useful Improvements in Feather-Renovators; and we do hereby declare that the following is a full, clear, and exact description thereof, which will enable others skilled in the art to which it appertains to make and use the same, reference being had to the accompanying drawings, which form a part of this specification.

Our invention relates to machines for scalding, purifying, and renovating feathers; and it consists in an improved construction, arrangement, and combination of parts, substantially as hereinafter more fully described, and pointed out in the claim.

In the drawing, Figure 1 is a side elevation. Fig. 2 is a vertical longitudinal section. Fig. 3 is a front view; and Fig. 4 is a vertical transverse section.

Similar letters of reference indicate corresponding parts in all the figures.

Our improved renovator consists essentially of three parts—viz., an upper part or box-cover, A, a rectangular frame, denoted by A', and a semicircular bottom, denoted by B. Frame A' has two trunnions, $a\ a$, one on each side, which rest in slots or bearings $c\ c$ in the standards or side pieces C C, which are united by a cross-piece, C', mortised into a base or board, D, as shown. The rear end of frame A' is supported upon a removable prop, E, provided with a step or shoulder, $e$, which fits in under the frame, as shown in Figs. 1 and 2.

The removable rectangular box or cover A has two openings, one, $f$, in the top, and another, $g$, on one side, both of which are covered with hinged wire screens. On the outer side of each of these screens is hinged a closely-fitting door, denoted by $f'$ and $g'$, respectively.

The semicircular trough B has a false bottom, B', which is provided with a series of perforations, $b$, opening up into the machine; and below these perforations, which are arranged in three or more parallel rows extending the entire length of the trough, is another trough or chamber, F, Fig. 4, reaching from end to end.

Each end of the rectangular frame A' is provided with journals or bearings for the agitator-shaft G, provided with cross-arms $k$, which carry the fans or beaters H for stirring or agitating the feathers. Shaft G may be rotated by a crank, I, placed at one or both ends of the shaft.

From the foregoing description the operation of our improved feather-renovator will be readily understood. The feathers being placed in the machine through the upper opening, $f$, this is closed, first, with the screen-door and then with the outer closely-fitting door $f'$. At the same time the side opening, $g$, is closed by its screen and door $g'$, so that the whole box will be steam-tight. Steam is then turned on through a pipe leading from the boiler to a perforation, $i$, opening into the trough or steam-chamber F, from which the steam escapes up into the box through the openings $b\ b\ b$. Meanwhile the feathers are kept stirred by the agitator G $k$ H, and occasionally inspected through the screen in the side opening by opening its door $g'$.

After the feathers have been thoroughly steamed both doors $f'$ and $g'$ are thrown open, and the steam-pipe is changed from opening $i$ to $h$, which latter lets the steam into the chamber formed between the false bottom B' with pan F and lower trough, B, from which it cannot escape into the box, as the perforations $b\ b\ b$ are covered by pan F. The superfluous steam passes out through an opening, $h'$, in like manner as the steam let into pan F escapes, after condensation, out through the outlet $i'$.

By this process the feathers, which are kept constantly agitated, are dried, the vapors passing out through the screen-doors, and the water of condensation which remains passing off through the perforations $b'$, pan F, and opening $i'$.

After the feathers have been dried the machine is tilted upon its trunnions $a\ a$ by raising its rear end up upon the top or head E' of prop E, which is moved forward, as indicated in dotted lines in Fig. 1, so that the contents may readily be emptied out.

Having thus described our invention, we claim and desire to secure by Letters Patent of the United States—

As an improvement in feather-renovators, the tilting frame A', having trunnions a a, and supporting the box-cover A and trough B B', in combination with the standards C C and movable stepped prop E, substantially as and for the purpose hereinbefore set forth.

In testimony that we claim the foregoing as our own we have hereto affixed our signatures in presence of two witnesses.

ROBERT EMMET GIBBONS.
    DAVID N. ASHMORE.

Witnesses:
    HARRISON HELDENBRAND,
    PERCIVILLE B. WILLIAMS.